United States Patent
Ishimura

(10) Patent No.: US 9,381,935 B2
(45) Date of Patent: Jul. 5, 2016

(54) STEERING DEVICE

(71) Applicant: JTEKT CORPORATION, Osaka-shi, Osaka (JP)

(72) Inventor: Shoji Ishimura, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/816,339

(22) Filed: Aug. 3, 2015

(65) Prior Publication Data

US 2016/0052537 A1  Feb. 25, 2016

(30) Foreign Application Priority Data

Aug. 19, 2014  (JP) .................. 2014-166758

(51) Int. Cl.
  *B62D 1/19*  (2006.01)
  *B60R 25/02*  (2013.01)
  *B62D 1/184*  (2006.01)

(52) U.S. Cl.
  CPC ............. *B62D 1/192* (2013.01); *B60R 25/02* (2013.01); *B62D 1/184* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 7,413,222 B2* | 8/2008 | Higashino | ............... | B62D 1/192 280/775 |
| 7,798,525 B2* | 9/2010 | Cymbal | ................ | B62D 1/192 280/777 |
| 8,167,502 B2* | 5/2012 | Davies | ................... | B62D 1/184 384/571 |
| 9,242,667 B2* | 1/2016 | Yoshihara | ............... | B62D 1/184 |
| 2012/0198956 A1 | 8/2012 | Takezawa et al. | | |
| 2015/0266497 A1* | 9/2015 | Yoshihara | ............... | B62D 1/184 74/493 |

FOREIGN PATENT DOCUMENTS

| | | |
|---|---|---|
| DE | 10 2008 054363 A1 | 5/2009 |
| EP | 2 022 699 A2 | 2/2009 |
| EP | 2423073 A1 | 2/2012 |
| JP | 2012-162152 A | 8/2012 |

OTHER PUBLICATIONS

Jan. 22, 2016 extended Search Report issued in European Patent Application No. 15181354.0.

* cited by examiner

*Primary Examiner* — Nicole Verley
(74) *Attorney, Agent, or Firm* — Oliff PLC

(57) ABSTRACT

In a steering device, a restriction member urged by an urging member restricts rotation of an inner tube when the restriction member is at an inserted position at which the restriction member is inserted into a second opening of the inner tube through a first opening of an outer tube. When the inner tube moves to contract a steering column upon a secondary collision, a driving edge portion of the second opening drives the restriction member to a position at which the restriction member is retracted from the second opening against the urging member.

5 Claims, 6 Drawing Sheets ated within Japanese Patent Application Publication No. 2012-162152
STEERING DEVICE

INCORPORATION BY REFERENCE

The disclosure of Japanese Patent Application No. 2014-166758 filed on Aug. 19, 2014 including the specification, drawings and abstract, is incorporated herein by reference in its entirety.

BACKGROUND OF THE INVENTION

1. Field of the Invention

The present invention relates to a steering device.

2. Description of Related Art

Hitherto, there has been known a steering device including a column having an outer column and an inner column. See Japanese Patent Application Publication No. 2012-162152 (JP 2012-162152 A). In the steering device, the inner column is relatively movable with respect to the outer column. The inner column is disposed on the upper side with respect to the outer column. The steering device is configured to lock the inner column so that the inner column does not move with respect to the outer column by reducing the diameter of a holding body portion of the outer column by tightening a pair of tightening pieces of the outer column by use of a tightener including a bolt shaft.

Normally, a keylock device is attached to the inner column on the upper side. The keylock device is a device that restricts rotation of a steering member when an ignition key is extracted.

The keylock device includes a protruding portion that advances toward and retracts from the center axis of the steering shaft in response to extraction and insertion of the ignition key. When the protruding portion is inserted into an engagement groove provided in the steering shaft, rotation of the steering shaft is restricted. In addition, as rotation of the steering shaft is restricted, rotation of the steering member connected to an end portion of the steering shaft is also restricted.

When an excessive torque load is applied to the inner column, however, the inner column is rotated to release engagement between the protruding portion and the engagement groove, which may release restriction on rotation of the steering shaft. This may hinder the function of the keylock device, which may result in theft of the vehicle.

In order to prevent such a situation, it is necessary to restrict rotation of the inner column with respect to the outer column. However, carelessly providing a rotation restriction mechanism may hinder contracting operation of the steering column upon a secondary collision, which may adversely affect energy absorption performance upon the secondary collision.

SUMMARY OF THE INVENTION

It is an object of the present invention to provide a steering device having a rotation restriction mechanism that does not adversely affect contraction of a steering column upon a secondary collision.

According to an aspect of the present invention, a steering device includes: a steering member; a steering shaft, to one end of which the steering member is coupled; a steering column including an outer tube and an inner tube that are fitted so as to be relatively slidable with respect to each other, the steering column supporting the steering shaft and being contractable upon a secondary collision; and a rotation restriction mechanism that restricts rotation of the inner tube. The outer tube includes a first opening. The inner tube includes a second opening. The second opening includes: a pair of rotation restricted edge portions that face each other in a circumferential direction; and a driving edge portion that crosses the pair of rotation restricted edge portions. The rotation restriction mechanism includes: a support shaft, a position of which with respect to the outer tube is not varied upon the secondary collision; a restriction member supported on an outer periphery of the support shaft so as to be relatively rotatable, the restriction member being displaceable between an inserted position at which the restriction member is inserted into the second opening through the first opening and a retracted position at which the restriction member is retracted from the second opening; and an urging member that urges the restriction member toward the inserted position. The restriction member includes: a rotation restricting portion that engages with a corresponding one of the rotation restricted edge portions at the inserted position to restrict relative rotation between the tubes; and a driven portion that engages with the driving edge portion upon the secondary collision. The driving edge portion is configured to drive the restriction member toward the retracted position via the driven portion upon the secondary collision.

With the steering device according to the aspect, the rotation restricting portion of the restriction member engages with the rotation restricted edge portion of the second opening when the restriction member which is urged by the urging member is at the inserted position at which the restriction member is inserted into the second opening of the inner tube through the first opening of the outer tube. This restricts rotation of the inner tube. Consequently, the rigidity of the steering column in the rotational direction can be secured, which prevents the inner tube from rotating even if a torque load acts on the inner tube.

In addition, when the inner tube and the outer tube relatively slide to contract the steering column upon a secondary collision, the driving edge portion of the second opening drives the restriction member to the retracted position at which the restriction member is retracted from the second opening. Thus, the rotation restriction mechanism does not adversely affect contraction of the steering column upon a secondary collision.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described below with reference to the accompanying drawings.

Figure 1:
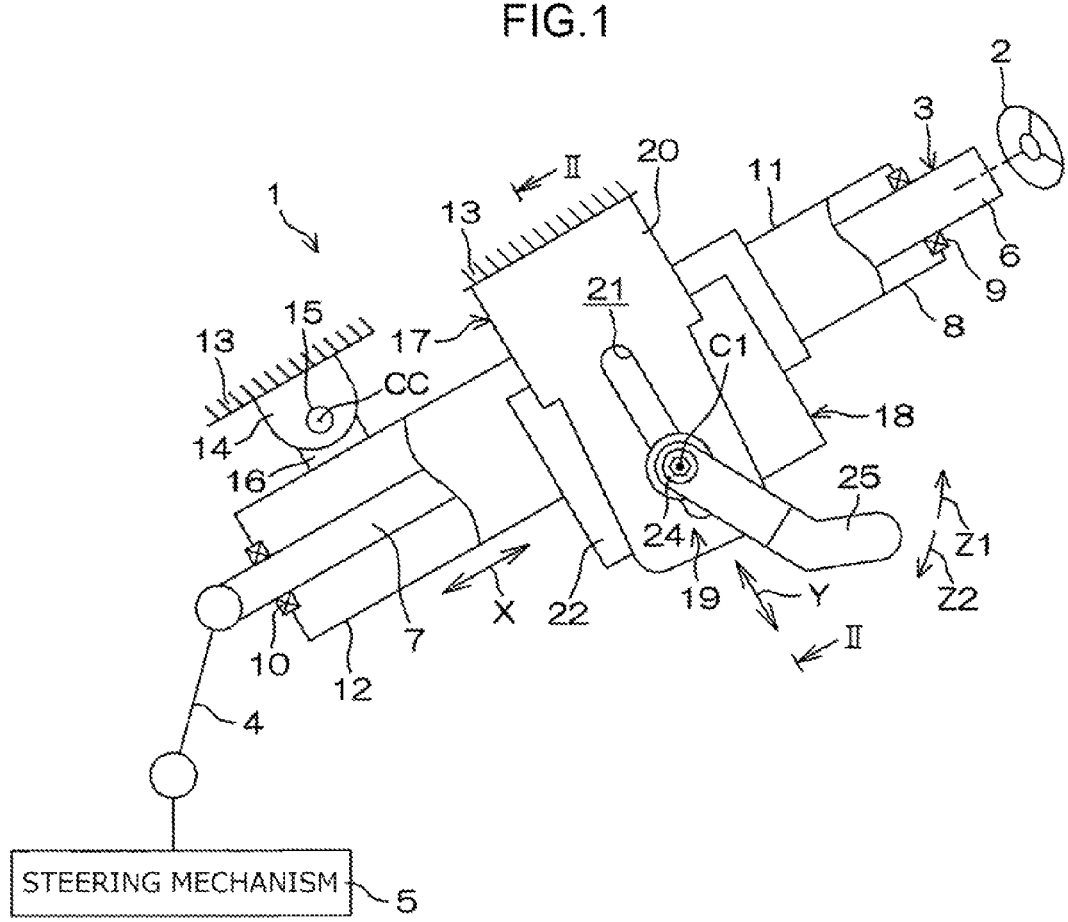
FIG. 1 is a schematic sectional view of a steering device according to an embodiment of the present invention, illustrating a schematic configuration of the steering device.

FIG. 1 is a schematic sectional view illustrating a schematic configuration of a steering device according to an embodiment of the present invention. A steering device 1 includes a steering member 2 such as a steering wheel, a steering shaft 3, to one end of which in an axial direction X the steering member 2 is coupled, and a steering mechanism 5 coupled to the steering shaft 3 via an intermediate shaft 4 etc.

The steering mechanism 5 is a rack-and-pinion mechanism, for example, that steers steered wheels (not illustrated) in conjunction with a steering operation of the steering member 2. Rotation of the steering member 2 is transferred to the steering mechanism 5 via the steering shaft 3, the intermediate shaft 4, etc. Rotation transferred to the steering mechanism 5 is converted into axial movement of a rack shaft (not illustrated). Consequently, the steered wheels are steered.

The steering shaft 3 includes a tubular upper shaft 6 and a lower shaft 7 that are fitted so as to be relatively slidable through spline fitting or serration fitting, for example. The steering member 2 is coupled to one end of the upper shaft 6. The steering shaft 3 is expandable in the axial direction X.

The steering device 1 includes a hollow steering column 8 that rotatably supports the steering shaft 3. The steering shaft 3 is inserted through the steering column 8, and supported by the steering column 8 so as to be rotatable via a plurality of bearings 9 and 10.

The steering column 8 includes an inner tube 11, which is an upper tube, and an outer tube 12, which is a lower tube, fitted so as to be relatively slidable. The steering column 8 is expandable in the axial direction X. The inner tube 11 supports the upper shaft 6 so as to be rotatable via the bearing 9. The inner tube 11 is coupled to the upper shaft 6 so as to be movable in accompaniment in the axial direction X of the steering shaft 3 via the bearing 9.

The steering device 1 includes a fixed bracket 14 fixed to a vehicle body 13, a tilt center shaft 15 supported by the fixed bracket 14, and a column bracket 16 fixed to the outer periphery of the outer tube 12 and rotatably supported by the tilt center shaft 15. The steering column 8 and the steering shaft 3 are tiltable in a tilt direction Y about a tilt center CC which is the center axis of the tilt center shaft 15.

The steering device 1 is configured as a steering device having a tilt adjustment mechanism that adjusts the inclined position of the steering member 2 in the tilt direction Y by tilting the steering shaft 3 and the steering column 8 about the tilt center CC.

The steering device 1 according to the embodiment does not have a telescopic adjustment function of adjusting the axial position of the steering member 2 by moving or expanding and contracting the steering shaft 3 and the steering column 8 in the axial direction X. The steering device 1 has a function of absorbing a shock by contracting the steering column 8 in the axial direction X together with the steering shaft 3 upon a secondary collision.

The steering device 1 includes a first bracket 17 fixed to the vehicle body 13, a second bracket 18 (corresponding to a distance bracket) fixed to the inner tube 11 of the steering column 8, and a lock device 19. The lock device 19 locks the relative positions of the brackets 17 and 18, which fixes the steering column 8 in position with respect to the vehicle body 13 to fix the steering member 2 in position.

The first bracket 17 includes a pair of first side plates 20 (only one of the first side plates 20 is illustrated in FIG. 1) to be tightened. A long tilt groove 21 that extends in the tilt direction Y to serve as a first insertion groove is formed in each of the first side plates 20. The second bracket 18 includes a pair of second side plates 22 (only one of the second side plates 22 is illustrated in FIG. 1) to be tightened. A second insertion groove 23 (see FIG. 2) is formed in each of the second side plates 22.

As illustrated in FIG. 1, the lock device 19 includes the first side plates 20 and the second side plates 22 to be tightened, a tightening shaft 24 inserted through the long tilt grooves 21 (first insertion grooves) of the first side plates 20 and the second insertion grooves 23 of the second side plates 22, and an operation lever 25 that is rotatable together with the tightening shaft 24 and that is rotationally operated by a driver. A center axis C1 of the tightening shaft 24 corresponds to the center of rotation of the operation lever 25. The operation lever 25 is operated in a locking direction Z1 and an unlocking direction Z2 that is opposite to the locking direction Z1 about the center of rotation (the center axis C1 of the tightening shaft 24).

Figure 2:
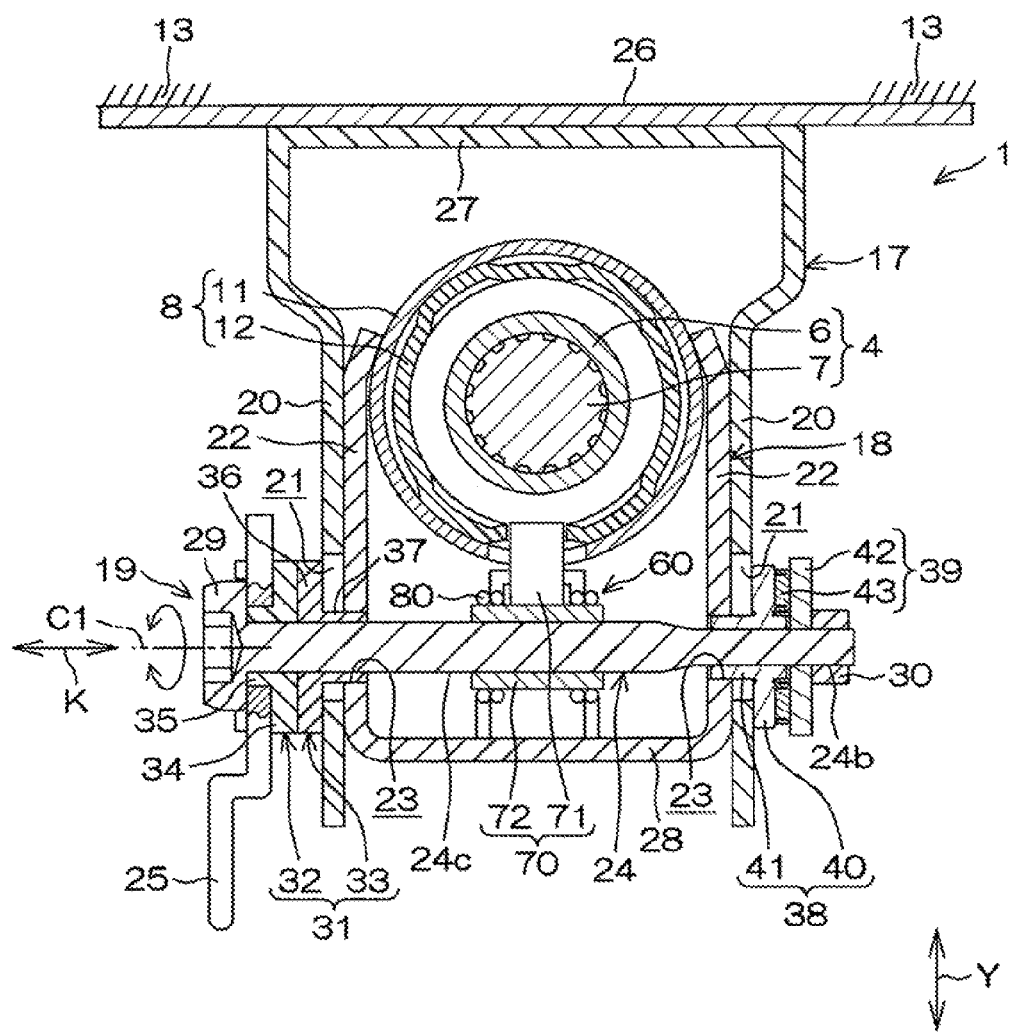
FIG. 2 is a sectional view of an essential portion of the steering device taken along the line II-II of FIG. 1.

As illustrated in FIG. 2, the first bracket 17 includes an attachment plate 26 supported on the vehicle body 13, a top plate 27 fixed along the attachment plate 26, and the pair of first side plates 20 discussed earlier which extend downward in the tilt direction Y from both ends of the top plate 27. The top plate 27 and the first side plates 20 form a groove shape as a whole.

The second bracket 18 includes the pair of second side plates 22 discussed earlier which face the pair of first side plates 20 of the first bracket 17, respectively, and a coupling plate 28 that couples between the lower ends of the pair of second side plates 22 in the tilt direction Y. The second bracket 18 forms a groove shape as a whole.

The tightening shaft 24 includes a bolt that penetrates the long tilt grooves 21 of the first side plates 20 of the first bracket 17 and the second insertion grooves 23 of the second side plates 22 of the second bracket 18. A head portion 29 provided at one end of a shaft portion 24a of the tightening shaft 24 is fixed so as to be rotatable together with the operation lever 25. A screw portion 24b provided at the other end of the shaft portion 24a of the tightening shaft 24 is screwed to a nut 30.

The lock device 19 includes a force conversion mechanism 31 that converts operating torque of the operation lever 25 into an axial force of the tightening shaft 24 as the operation lever 25 is operated to rotate. The force conversion mechanism 31 functions as a tightening mechanism that locks the inclined position of the steering column 8 (hereinafter referred to as "tilt lock") after tilt adjustment by tightening the first side plates 20 to the respective second side plates 22 as the operation lever 25 is operated to rotate in the locking direction Z1.

The force conversion mechanism 31 includes a first cam 32 supported by the outer periphery of the shaft portion 24a of the tightening shaft 24 to rotate together with the operation lever 25, and a second cam 33 which is supported by the shaft portion 24a of the tightening shaft 24 and rotation of which is restricted by the long tilt groove 21. The second cam 33 functions as one tightening member that tightens one of the first side plates 20 to the corresponding second side plate 22.

The first cam 32 is coupled to the operation lever 25 so as to be rotatable together. Movement of the first cam 32 in an axial direction K with respect to the tightening shaft 24 is restricted. Rotation of the operation lever 25 with respect to the head portion 29 of the tightening shaft 24 is restricted. The first cam 32 includes an annular plate 34 and a boss 35 that extends in the axial direction from the annular plate 34 to be inserted through an insertion hole of the operation lever 25 so as to be rotatable together.

The second cam 33 includes an annular plate 36 that faces the annular plate 34 of the first cam 32, and a boss 37 that extends in the axial direction from the periphery of the center hole of the annular plate 36. The boss 37 is inserted through the long tilt groove 21 of the first side plate 20 so that rotation of the boss 37 is restricted, which restricts rotation of the second cam 33 about the center axis C1. The boss 37 permits rotation of the tightening shaft 24.

The lock device 19 includes the other tightening member 38 that tightens the other first side plate 20 to the corresponding second side plate 22, the nut 30 discussed earlier, and an interposed member 39 interposed between the other tightening member 38 and the nut 30.

The other tightening member 38 includes an annular plate 40 that faces the other first side plate 20, and a boss 41 that extends in the axial direction from the periphery of the center hole of the annular plate 40. The boss 41 is inserted into the long tilt groove 21 of the other first side plate 20 of the first bracket 17 so that rotation of the boss 41 is restricted, which restricts rotation of the other tightening member 38 about the center axis C1. The boss 41 permits rotation of the tightening shaft 24.

The operation lever 25, the first cam 32, and the second cam 33 which serves as one tightening member are interposed between the head portion 29 of the tightening shaft 24 and one of the first side plates 20. The other tightening member 38 and the interposed member 39 are interposed between the nut 30 and the other of the first side plates 20 of the first bracket 17. The first cam 32, the second cam 33 (one tightening member), the other tightening member 38, and the interposed member 39 are supported by the outer periphery of the tightening shaft 24. The second cam 33 (one tightening member) and the other tightening member 38 are supported so as to be movable in the axial direction K of the tightening shaft 24.

The interposed member 39 includes a washer 42 interposed between the nut 30 and the tightening member 38, and a needle roller bearing 43 interposed between the washer 42 and the annular plate 40 of the tightening member 38.

As the operation lever 25 is rotated, the first cam 32 is rotated with respect to the second cam 33 (one tightening member) to move the second cam 33 in the axial direction K of the tightening shaft 24 so that the first side plates 20 of the first bracket 17 are tightened between the annular plate 36 of the second cam 33 and the annular plate 40 of the other tightening member 38.

Consequently, the first side plates 20 of the first bracket 17 are brought into press contact with the respective second side plates 22 of the second bracket 18 to achieve tilt lock.

Figure 3A:
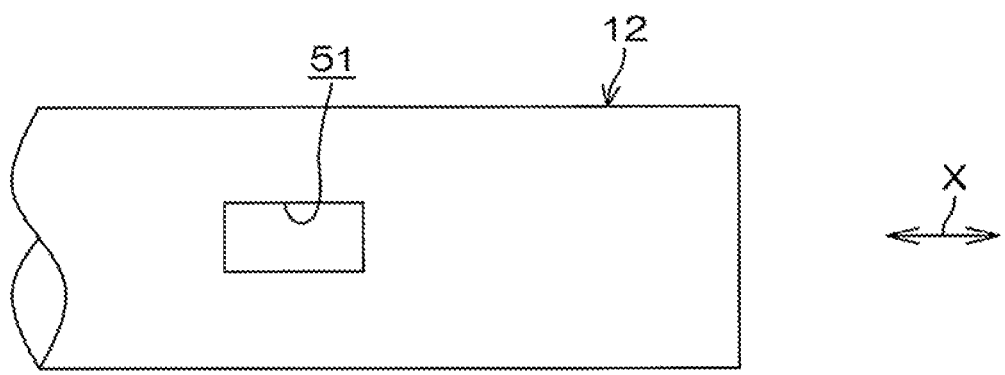
FIG. 3A is a schematic illustration of an outer tube.
Figure 3B:
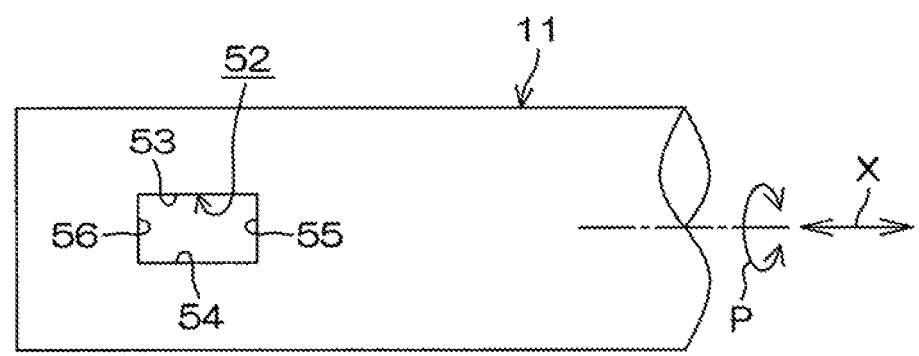
FIG. 3B is a schematic illustration of an inner tube.

As illustrated in FIG. 3A, the outer tube 12 includes a first opening 51 having a rectangular shape, for example. As illustrated in FIG. 3B, the inner tube 11 includes a second opening 52 having a rectangular shape, for example. The second opening 52 includes a pair of rotation restricted edge portions 53 and 54 that face each other in a circumferential direction P of the inner tube 11, a driving edge portion 55 that crosses the pair of rotation restricted edge portions 53 and 54, and an extraction restricted edge portion 56 that faces the driving edge portion 55 in the axial direction X.

Figure 5:
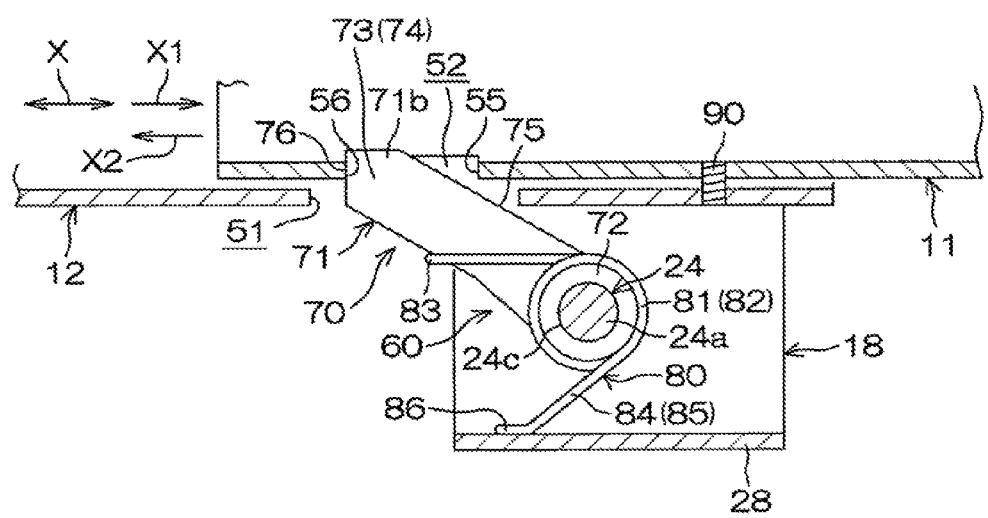
FIG. 5 is a schematic sectional view of a steering column and a rotation restriction mechanism, illustrating a state during normal times.

As illustrated in FIG. 5, the inner tube 11 and the outer tube 12 are coupled to each other with a predetermined holding force via a resin pin 90. The resin pin 90 is disposed in insertion holes of the tubes 11 and 12 extending in the radial direction such that the resin pin 90 extends over the insertion holes. Upon a secondary collision in which the inner tube 11 moves downward X2 in the axial direction, the resin pin 90 is split into two split bodies 90a and 90b by shearing (see FIG. 6A).

Figure 4:
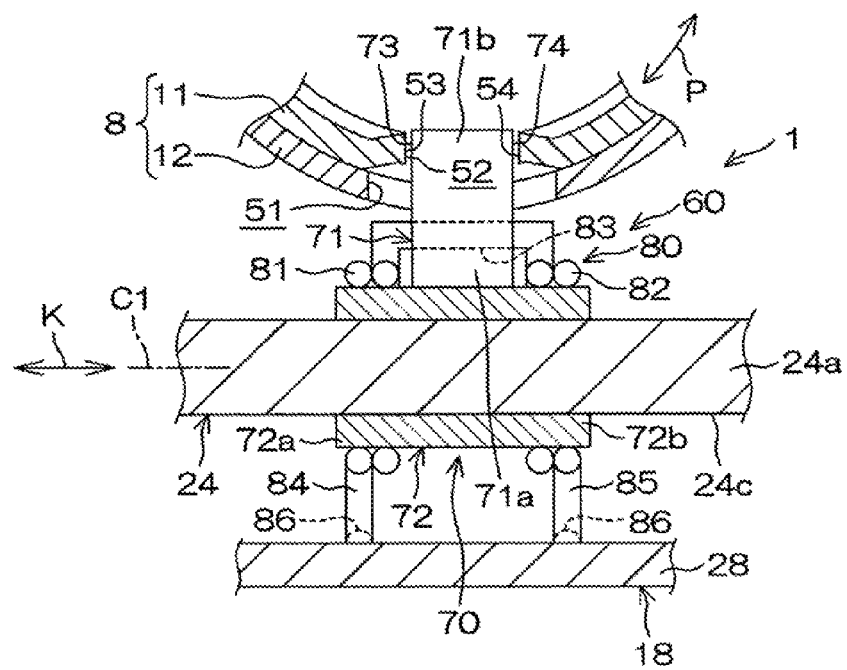
FIG. 4 is a sectional view of an essential portion of the steering device obtained by enlarging a part of FIG. 2.

As illustrated in FIGS. 2 and 4, the steering device 1 includes a rotation restriction mechanism 60 that restricts rotation of the inner tube 11.

The rotation restriction mechanism 60 includes the tightening shaft 24 which constitutes a support shaft that serves as a support member, the position of which with respect to the outer tube 12 is not varied upon a secondary collision, a restriction member 70 supported by the tightening shaft 24 so as to be relatively rotatable, and an urging member 80 such as a torsion spring that urges the restriction member 70.

Figure 6A:
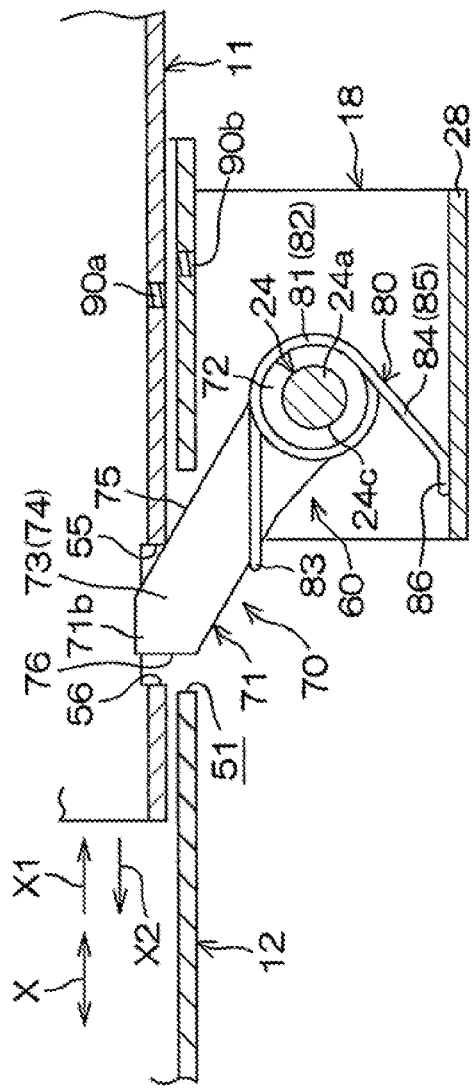
FIG. 6A is a schematic sectional view of the steering column and the rotation restriction mechanism, illustrating an initial state upon a secondary collision.
Figure 6B:
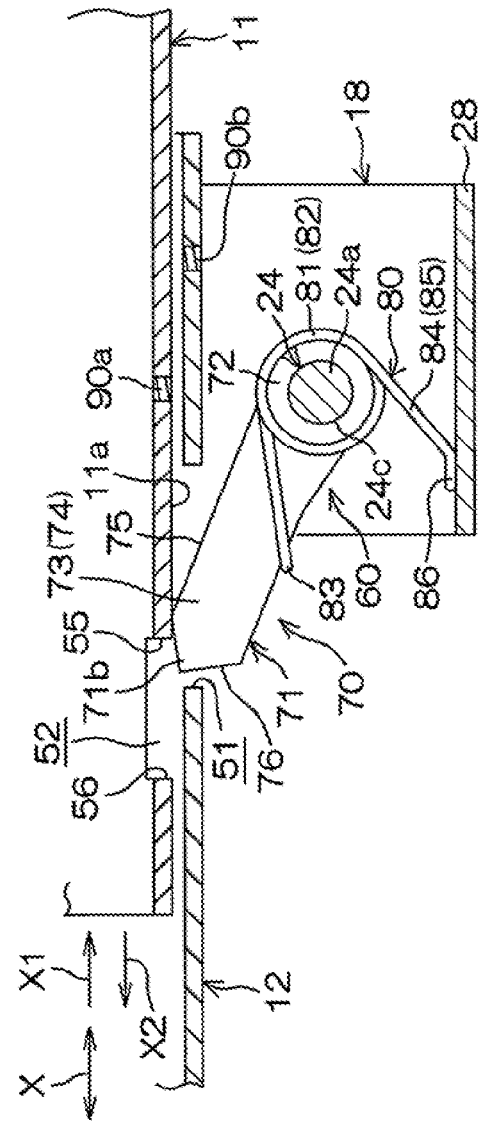
FIG. 6B is a schematic sectional view of the steering column and the rotation restriction mechanism, illustrating an intermediate state upon a secondary collision.

The restriction member 70 is displaced between an inserted position at which the restriction member 70 is inserted into the second opening 52 through the first opening 51 as illustrated in FIG. 5 and a retracted position at which the restriction member 70 is retracted from the second opening 52 as illustrated in FIG. 6B. The urging member 80 urges the restriction member 70 toward the inserted position illustrated in FIG. 5.

Figure 7:
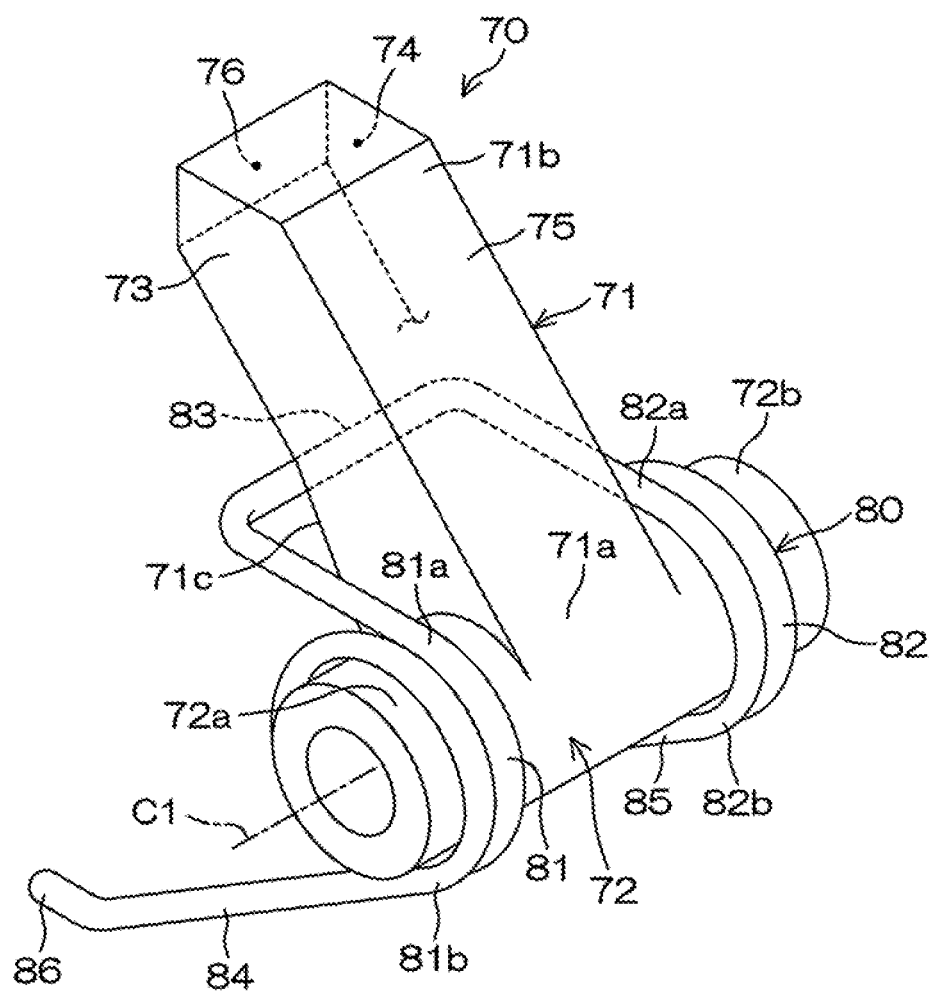
FIG. 7 is a schematic perspective view of a restriction member and an urging member of the rotation restriction mechanism.

As illustrated in FIGS. 4, 5, and 7, the restriction member 70 includes an arm 71 having a base end portion 71a and a distal end portion 71b, and a boss 72 integrally coupled to the base end portion 71a of the arm 71. The boss 72 is fitted with the outer periphery of the tightening shaft 24 (an outer periphery 24c of the shaft portion 24a) so as to be relatively rotatable.

As illustrated in FIG. 5, when the restriction member 70 is at the inserted position, the distal end portion 71b of the arm 71 is inserted into the second opening 52. As illustrated in FIG. 4, the restriction member 70 includes a pair of rotation restricting portions 73 and 74 that engage with the respective rotation restricted edge portions 53 and 54 at the inserted position to restrict rotation of the inner tube 11. As illustrated in FIG. 7, the rotation restricting portions 73 and 74 are disposed at the distal end portion 71b of the arm 71.

The restriction member 70 includes a driven portion 75 that engages with the driving edge portion 55 of the second opening 52 as illustrated in FIG. 6A upon a secondary collision. The driven portion 75 is constituted of a cam surface inclined with respect to the axial direction X. As illustrated in FIG. 7, the driven portion 75 is disposed at the distal end portion 71b of the arm 71. The driving edge portion 55 of the second opening 52 of the inner tube 11 is configured to drive the restriction member 70 to the retracted position (see FIG. 6B) via the driven portion 75 as illustrated in FIG. 6A upon a secondary collision.

As illustrated in FIG. 5, the restriction member 70 includes an extraction restricting portion 76 that engages with the extraction restricted edge portion 56 of the second opening 52 of the inner tube 11 to restrict extraction of the inner tube 11 from the outer tube 12. As illustrated in FIG. 7, the extraction restricting portion 76 is disposed at the distal end portion 71b of the arm 71. The boss 72 of the restriction member 70 includes a pair of projecting portions 72a and 72b that project from both sides of the base end portion 71a of the arm 71.

As illustrated in FIG. 7, the urging member 80 includes coil portions 81 and 82 wound around the outer periphery of the pair of projecting portions 72a and 72b of the boss 72, and an urging portion 83 that couples between first ends 81a and 82a of the coil portions 81 and 82 and that is engaged with an intermediate portion 71c of the arm 71.

The urging member 80 includes extended portions 84 and 85 extended from second ends 81b and 82b of the coil portions 81 and 82 so that extended ends 86 of the respective extended portions 84 and 85 are received by the coupling plate 28 of the second bracket 18 as illustrated in FIG. 5.

As illustrated in FIG. 5, the urging member 80 rotationally urges the restriction member 70 about the center axis C1 of the tightening shaft 24 (clockwise in FIG. 5) by use of the urging portion 83 to urge the restriction member 70 toward the inserted position.

According to the embodiment, the rotation restricting portions 73 and 74 of the restriction member 70 engage with the rotation restricted edge portions 53 and 54 of the second opening 52 as illustrated in FIG. 4 when the restriction member 70 which is urged by the urging member 80 is at the inserted position at which the restriction member 70 is inserted into the second opening 52 of the inner tube 11 through the first opening 51 of the outer tube 12 as illustrated in FIG. 5. This restricts rotation of the inner tube 11. Consequently, the rigidity of the steering column 8 in the rotational direction can be secured.

The inner tube 11 has an opening (not illustrated) that is different from the second opening 52. A keylock device (not illustrated) is provided in the different opening. The keylock device includes a protruding portion that advances toward the center axis of the steering shaft 3 when an ignition key is extracted and that retracts away from the center axis of the steering shaft 3 when the ignition key is inserted.

The steering shaft 3 is provided with a keylock collar having an engagement groove. When the ignition key is extracted and the protruding portion advances to be engaged in the engagement groove, rotation of the steering shaft 3 is restricted, that is, rotation of the steering member 2 is restricted, to establish a keylock state. Even in the keylock state, however, when an excessive torque load is applied from the outside to the inner tube 11, the inner tube 11 may rotate to release engagement between the protruding portion and the engagement groove, which may cancel the keylock state. According to the embodiment, however, rotation of the inner tube 11 is reliably restricted to secure the rigidity of the steering column 8 in the rotational direction. Restriction of rotation does not cause cancellation of the keylock state, and can prevent occurrence of theft of the vehicle accompanied by a malfunction of the keylock device for steering lock.

When the inner tube 11 moves downward X2 in the axial direction to contract the steering column 8 as illustrated in FIG. 6B upon a secondary collision, the driving edge portion 55 of the second opening 52 drives the restriction member 70 to the retracted position (see FIG. 6B) at which the restriction member 70 is retracted from the second opening 52 against the urging member 80. Thus, the rotation restriction mechanism 60 does not adversely affect contraction of the steering column 8 upon a secondary collision. As a result, stable shock absorption performance can be demonstrated.

Upon a secondary collision, the upper tube that serves as the inner tube 11 slides with respect to the lower tube that serves as the outer tube 12 supported by the vehicle body 13 and the support shaft (tightening shaft 24).

Since the tightening shaft 24 included in the lock device 19 which achieves tilt lock also serves as the support shaft which supports the restriction member 70, it is possible to simplify the structure.

Upon a secondary collision, the driving edge portion 55 of the second opening 52 of the inner tube 11 which moves downward X2 in the axial direction drives the restriction member 70 to the retracted position (see FIG. 6B) via the cam surface as the driven portion 75 which is inclined with respect to the axial direction X as illustrated in FIG. 6A.

The extraction restricting portion 76 of the restriction member 70 engages with the extraction restricted edge portion 56 of the second opening 52 during normal times or after a secondary collision, which restricts extraction of the inner tube 11 from the outer tube 12 upward X1 in the axial direction.

The present invention is not limited to the embodiment described above. For example, a support shaft (not illustrated) that supports the restriction member 70 may be provided separately from the tightening shaft 24.

A compression spring (not illustrated) such as a compression coil spring interposed between the intermediate portion 71c of the arm 71 of the restriction member 70 and the coupling plate 28 may be used in place of a torsion spring as the urging member 80.

What is claimed is:

1. A steering device comprising:
   a steering member;
   a steering shaft, to one end of which the steering member is coupled;
   a steering column including an outer tube and an inner tube that are fitted so as to be relatively slidable with respect to each other, the steering column supporting the steering shaft and being contractable upon a secondary collision; and
   a rotation restriction mechanism that restricts rotation of the inner tube, wherein:
   the outer tube includes a first opening;
   the inner tube includes a second opening, the second opening including a pair of rotation restricted edge portions that face each other in a circumferential direction and a driving edge portion that crosses the pair of rotation restricted edge portions;
   the rotation restriction mechanism includes
      a support shaft, a position of which with respect to the outer tube is not varied upon the secondary collision,
      a restriction member supported on an outer periphery of the support shaft so as to be relatively rotatable, the restriction member being displaceable between an inserted position at which the restriction member is inserted into the second opening through the first opening and a retracted position at which the restriction member is retracted from the second opening, and
      an urging member that urges the restriction member toward the inserted position;
   the restriction member includes
      a rotation restricting portion that engages with a corresponding one of the rotation restricted edge portions at the inserted position to restrict relative rotation between the outer tube and the inner tube, and
      a driven portion that engages with the driving edge portion upon the secondary collision; and
   the driving edge portion is configured to drive the restriction member toward the retracted position via the driven portion upon the secondary collision.

2. The steering device according to claim 1, wherein:
   the outer tube is a lower tube supported by a vehicle body;
   the inner tube is an upper tube; and
   the support shaft is supported by the vehicle body.

3. The steering device according to claim 2, further comprising:
   a lock device, wherein:
   the lock device includes a first side plate including a long tilt groove and supported on the vehicle body,
a second side plate including an insertion groove and fixed to the outer tube,
a tightening shaft that serves as the support shaft inserted through the long tilt groove of the first side plate and the insertion groove of the second side plate, and
an operation lever that rotates together with the tightening shaft; wherein
the lock device is configured to fix the steering member in position by tightening the first side plate to the second side plate by operating the operation lever after the steering member is adjusted to a desired inclined position with respect to the vehicle body.

4. The steering device according to claim 1, wherein the driven portion is a cam surface inclined with respect to an axial direction of the inner tube.

5. The steering device according to claim 1, wherein:
the second opening includes an extraction restricted edge portion that faces the driving edge portion; and
the restriction member includes an extraction restricting portion that engages with the extraction restricted edge portion to restrict extraction of the inner tube from the outer tube.

* * * * *